(12) United States Patent
Tanaka

(10) Patent No.: US 8,298,430 B2
(45) Date of Patent: Oct. 30, 2012

(54) METHOD OF ETCHING MAGNETORESISTIVE FILM BY USING A PLURALITY OF METAL HARD MASKS

(75) Inventor: Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 985 days.

(21) Appl. No.: 11/976,545

(22) Filed: Oct. 25, 2007

(65) Prior Publication Data

US 2009/0110960 A1 Apr. 30, 2009

(51) Int. Cl.
*G11B 5/127* (2006.01)

(52) U.S. Cl. ........... 216/22; 216/41; 216/47; 216/49; 216/51; 216/67; 204/192.34

(58) Field of Classification Search .............. None
See application file for complete search history.

(56) References Cited

U.S. PATENT DOCUMENTS

| | | | |
|---|---|---|---|
| 6,493,926 B2 * | 12/2002 | Han et al. | 29/603.14 |
| 6,712,984 B2 * | 3/2004 | Sasaki | 216/22 |
| RE40,951 E * | 11/2009 | Kodaira et al. | 216/22 |
| 7,641,324 B2 * | 1/2010 | Shimada | 347/70 |
| 7,765,676 B2 * | 8/2010 | Cyrille et al. | 29/603.12 |
| 7,881,010 B2 * | 2/2011 | Guthrie et al. | 360/122 |
| 2002/0167764 A1 * | 11/2002 | Fontana et al. | 360/313 |
| 2006/0165959 A1 * | 7/2006 | Bandic et al. | 428/172 |
| 2009/0168220 A1 * | 7/2009 | Komura et al. | 360/59 |

FOREIGN PATENT DOCUMENTS

| | | | |
|---|---|---|---|
| JP | A-07-161711 | | 6/1995 |
| JP | 10049832 A | * | 2/1998 |
| JP | A-10-049832 | | 2/1998 |
| JP | A-2001-266312 | | 9/2001 |
| JP | 2002214799 A | * | 7/2002 |
| JP | A-2002-214799 | | 7/2002 |
| JP | A-2007-081383 | | 3/2007 |

* cited by examiner

*Primary Examiner* — Anita Alanko
(74) *Attorney, Agent, or Firm* — Oliff & Berridge, PLC

(57) ABSTRACT

This etching method comprises the steps of forming first and second hard masks made of materials different from each other successively on a magnetoresistive film; forming a resist having a lower face opposing a front face of the second hard mask, a space being interposed between the front face and lower face; dry-etching the second hard mask by using the resist as a mask; etching the first hard mask by using the etched second hard mask; and etching the magnetoresistive film by using the first hard mask.

13 Claims, 10 Drawing Sheets

METHOD OF ETCHING MAGNETORESISTIVE FILM BY USING A PLURALITY OF METAL HARD MASKS

BACKGROUND OF THE INVENTION

1. Field of the Invention

The present invention relates to a method of etching a magnetoresistive (MR) film by using a plurality of hard masks.

2. Related Background Art

A magnetic head sensor has a magnetoresistive film whose resistance value changes in response to external magnetic fields. The magnetoresistive film has a magnetosensitive layer (free layer), while domain control films (bias layers) magnetically connected to the free layer are provided on both end parts in the track width direction of the free layer in order to control the direction of magnetization of the free layer. When manufacturing the magnetic head sensor, the magnetoresistive film formed on the substrate is etched with a mask. The mask is formed on a region corresponding to a track width of the magnetoresistive film, so that the area on the outside of this region is etched.

As the recording density of hard disk drives has been increasing, magnetoresistive films have been required to narrow their track width. However, no magnetoresistive film having such a narrow track width as to be employable in next-generation magnetic head sensors has been found yet.

A conventional magnetoresistive film etching technique using a mask has been described in Japanese Patent Application Laid-Open No. 2002-214799, for example. Techniques for etching various kinds of wiring with masks are described in Japanese Patent Application Laid-Open Nos. 2007-81383, HEI 10-49832, and HEI 7-161711, for example.

SUMMARY OF THE INVENTION

When a hard mask is used for etching a magnetoresistive film, its height can be made lower than that in the case using a resin mask (resist). Using the hard mask can make the angle of inclination of a surface to be etched (side face) in the magnetoresistive film closer to 90°, narrow the effective track width, and allow the magnetic field from a bias layer to act more effectively as compared with the case using the resin mask. However, the prior art has failed to etch a magnetoresistive film precisely with a sufficiently high controllability by using a hard mask and form the magnetoresistive film having a narrow track width.

The magnetoresistive film etching method in accordance with the present invention comprises the steps of forming first and second hard masks made of materials different from each other successively on a magnetoresistive film; forming a resist having a lower face opposing a front face of the second hard mask, a space being interposed between the front face and lower face; dry-etching the second hard mask by using the resist as a mask; etching the first hard mask by using the second hard mask patterned by etching; and etching the magnetoresistive film by using the first hard mask. This method can etch a magnetoresistive film precisely with a sufficiently high controllability and form the magnetoresistive film having a narrow track width.

Preferably, the maximum value W1 in the track width direction of the magnetoresistive film etched by using the hard masks, the width W2 in the track width direction of a free layer in the magnetoresistive film, and the thickness H1 between the upper and lower faces of the magnetoresistive film have the following relationships:

$$0 < W1 - W2 \leq 20 \text{ nm}$$

$$H1 \leq W2 \leq 70 \text{ nm}$$

$$5 \text{ nm} \leq H1 \leq 30 \text{ nm}$$

The height H1 of the magnetoresistive film is the thickness of a multilayer body interposed between a lower electrode layer and a metal cap layer thereabove. This multilayer body is made of a layer essentially functioning to change magnetoresistance, and is defined by the distance from the front face of a free layer of a ferromagnetic substance to a terminating surface of a magnetic-substance-containing layer contributing to fixing a direction of magnetization. The magnetic-substance-containing layer refers to a ferromagnetic layer whose direction of magnetization is fixed by spontaneous magnetization, a magnetic layer formed by exchange coupling of a ferromagnetic layer with an antiferromagnetic layer, or a layer having a nonmagnetic layer interposed therebetween.

Since the magnetoresistive film has a narrow width in the track width direction and steep side faces, the effective track width becomes narrower, whereby information can be read from a smaller magnetic recording area. Also, since the side faces of the magnetoresistive film are steep, the magnetic field from a bias film adjacent to the magnetoresistive film can be provided evenly within the magnetoresistive film.

DESCRIPTION OF THE PREFERRED EMBODIMENTS

In the following, embodiments of the magnetoresistive film etching method will be explained. This etching step is a part of a magnetoresistive device manufacturing process. The same constituents will be referred to with the same numerals or letters, while omitting their overlapping explanations.

Figure 1:
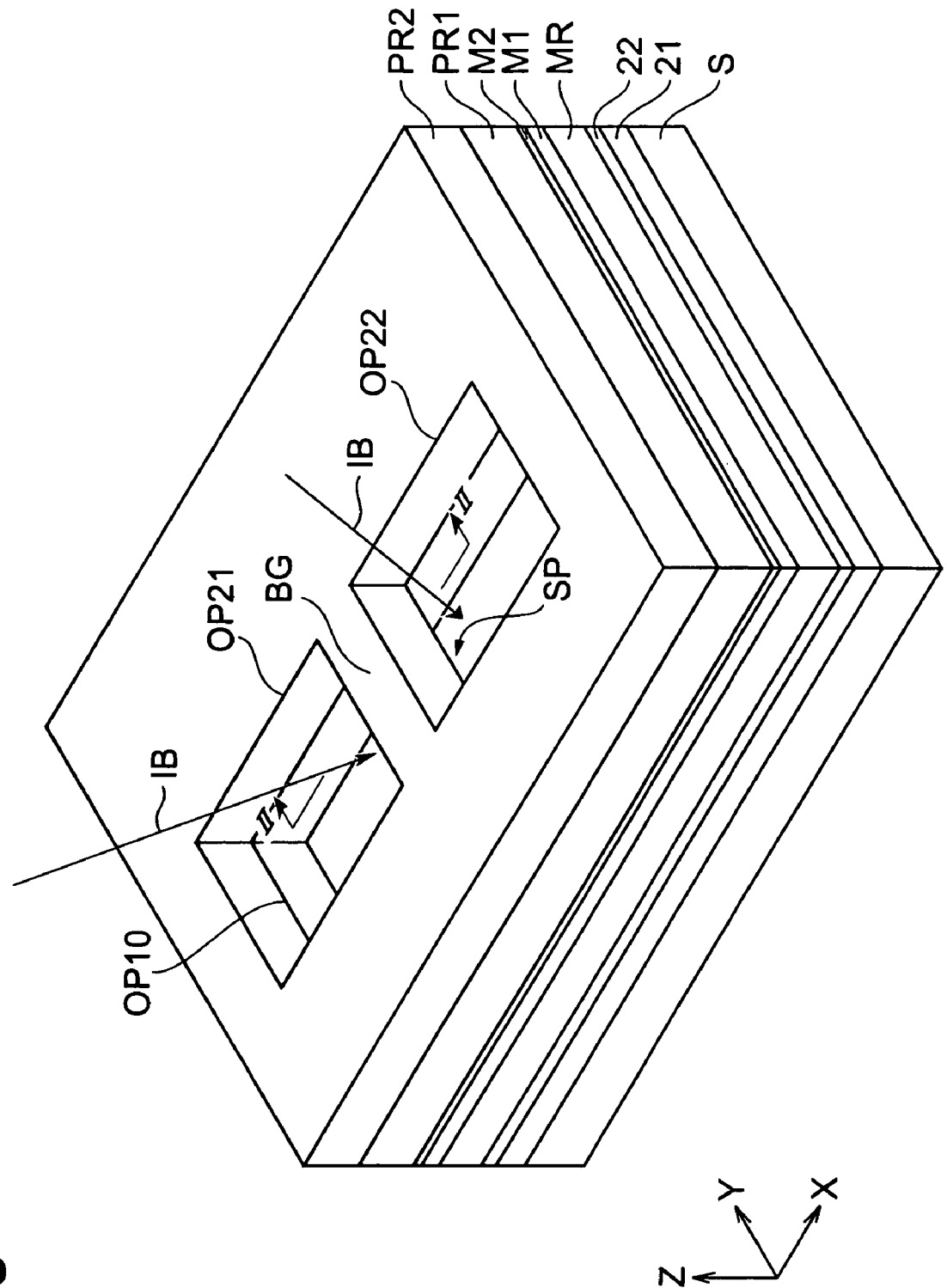
FIG. 1 is a perspective view of a magnetoresistive device intermediate.

FIG. 1 is a perspective view of a magnetoresistive device intermediate.

Let the Z axis, X axis, Y axis, and XZ plane be the thickness direction of a magnetoresistive film MR, the track width direction, the MR height direction, and the air bearing surface (ABS), respectively, and assume that the X, Y, and Z axes constitute an orthogonal coordinate system. Suppose that the front face of a nonmagnetic substrate S made of AlTiC or the like on which the device is formed is parallel to the XY plane.

In this magnetoresistive device intermediate, a lower magnetic shield 21, a lower metal layer 22, a magnetoresistive film MR, an upper first metal layer (first hard mask) M1, and an upper second metal layer (second hard mask) M2 are successively laminated on the substrate S.

Two layers of resists PR1, PR2 are successively formed on the upper second metal layer M2. The resists PR1, PR2 in this example are photoresists, but may be electron beam resists as well. The first resist PR1 positioned on the lower side has one rectangular opening OP10, while the second resist PR2 positioned on the upper side has two rectangular openings OP21, OP22 which are separated from each other. The two rectangular openings OP21, OP22 overlap the one rectangular opening OP10. The area between the openings OP21, OP22 of the second resist PR2 constitutes a bridge part BG, while a space SP is interposed between the bridge part BG and upper second metal layer M2.

Ion beam etching (IBE) is a method which irradiates and etches an object with an ion beam. When the upper second metal layer M2 positioned within the openings OP21, OP22 is obliquely irradiated with an ion beam IB while using the second resist PR2 as a mask, the areas directly under the openings OP21, OP22 and regions at both ends in the X-axis direction of the area directly under the bridge part BG are etched with the ion beam IB. The ion beam IB in this example is made of a noble gas (Ar).

The following method can be used for making the resist having the bridge part BG at a position separated in the Z direction from the upper second metal layer M2 as mentioned above.

To begin with, the first resist PR1 to be positioned on the lower side is applied onto the upper second metal layer M2, and the first exposure to light is performed in the area corresponding to the opening OP10. If the resist is of positive type, the unexposed area will remain at the time of development. After forming the first resist PR1 and before developing the same, the second resist PR2 is applied onto the first resist PR1, and the second exposure to light is performed in the areas corresponding to the openings OP21, OP22. Thereafter, the first resist PR1 and second resist PR2 are developed, whereby a resist having the above-mentioned bridge part BG is formed. When the width (in the X direction) of the bridge part BG is sufficiently small, a part of light in the second exposure irradiates the area under the bridge part BG as well, whereby a bridge structure can be formed even if the first exposure is omitted.

A resist having an alkali-soluble polyimide or the like having a thickness of 0.05 μm to 0.1 μm is preferably employed as the first resist PR1. Employable as the second resist PR2 is a chemically amplified resist or resist made of novolac resin which is thicker than the first resist PR1 and preferably has a thickness of 0.1 μm to 0.6 μm. As the first resist PR1, one whose dissolving rate with respect to a developer is higher than that of the second resist PR2 is used.

Figure 2:
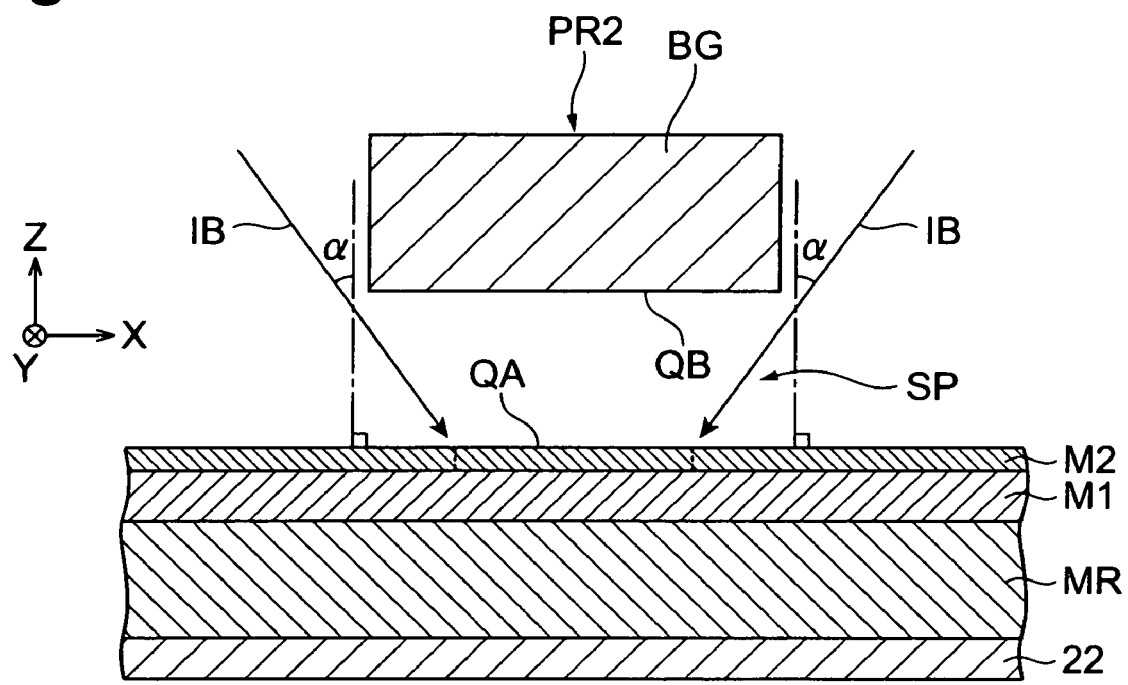
FIG. 2 is a sectional view of the magnetoresistive device intermediate taken along the line II-II of FIG. 1.

FIG. 2 is a sectional view of the magnetoresistive device intermediate taken along the line II-II of FIG. 1.

The upper second metal layer M2 is positioned under the bridge part BG of the second resist PR2. The ion beam IB is incident on the upper second metal layer M2 at an angle of a with respect to a normal of the front face of the upper second metal layer M2 (XY plane). Namely, the incident angle of the ion beam IB is the angle α within the XZ plane. The ion beam IB is incident on the upper second metal layer M2 positioned directly under the bridge part BG at an angle by which the layer is illuminable, while the incident angle α is greater than 0° but does not exceed 70°. In other words, the angle α formed between the normal of the wafer integrating surface and the ion gun emission direction is greater than 0° but does not exceed 70°.

When the substrate is rotated about the Z axis while the irradiation direction of the ion beam IB is fixed to one direction, the upper second metal layer M2 can be irradiated with the ion beam IB from both sides in the X-axis direction. The ion beam IB may be a pulsed beam intermittently emitted in synchronization with the rotation about the Z axis so as to advance within the XZ plane.

Thus, the etching method in accordance with this embodiment includes the step of forming the resist PR2 having the lower face QB opposing the front face QA of the upper second metal layer M2, while the space SP is interposed between the front face QA and lower face QB. Using the resist PR2 as a mask, the upper second metal layer M2 is dry-etched. This IBE forms the upper second metal layer M2 thinner than the resist width (the width in the X direction of the bridge part BG).

Figure 3:
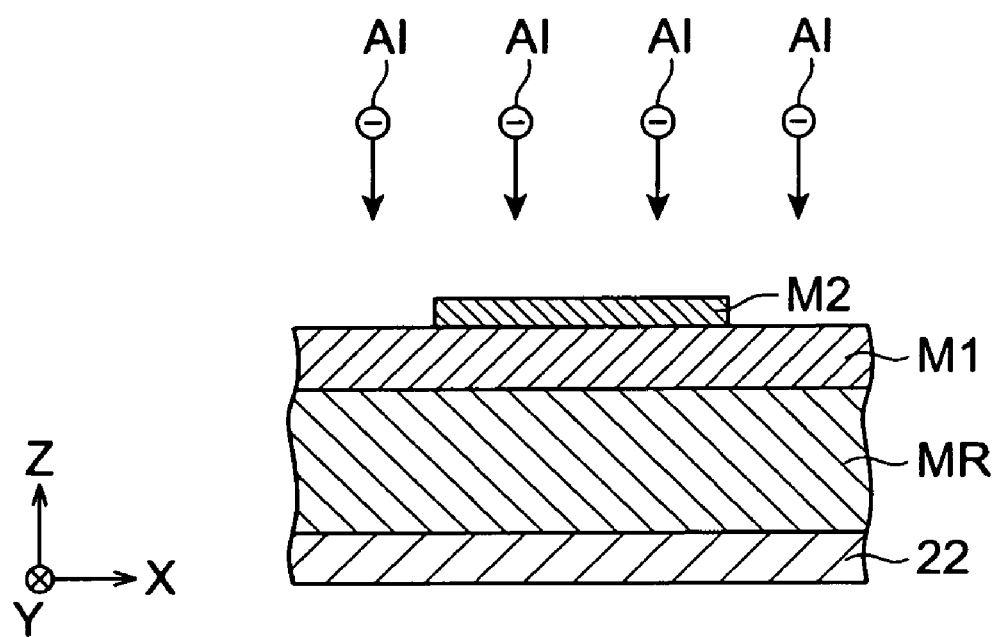
FIG. 3 is a sectional view of the magnetoresistive device intermediate.

FIG. 3 is a sectional view of the magnetoresistive device intermediate.

The above-mentioned step of IBE, which is a dry etching method, removes the upper second metal layer M2 except for the area located under a position near the center of gravity of the bridge part BG, thereby exposing the front face of the upper first metal layer M1. Preferably, the upper second metal layer M2 is made of a material whose etching rate with respect to a noble gas (Ar) is higher than that of the upper first metal layer M1.

Thereafter, the resists PR1, PR2 are removed with an organic solvent such as acetone.

Next, using the upper second metal layer M2 patterned by the etching as a mask, the upper first metal layer M1 is etched. Reactive ion etching (RIE), which is a dry etching method, is used for this etching. The upper second metal layer M2 is made of a material whose etching rate with respect to gases based on chlorine and fluorine is lower than that of the upper first metal layer M1. Employable as a gas species for RIE is a $CF_4$ gas.

Namely, it will be referred if the upper second metal layer M2 is made of a material whose etching rate with respect to a gas containing F or Cl in RIE is lower than that of the upper first metal layer M1, the upper first metal layer M1 contains at least one species selected from the metal group consisting of Ta, Ti, and W, and the upper second metal layer M2 contains at least one species selected from the metal group consisting of Ni, Co, Fe, and Cu.

For making the side faces of the magnetoresistive film MR steep, the upper first metal layer M1 positioned on the lower side is desired to be as thin as possible. Preferably, the thickness of the upper first metal layer M1 is greater than 0 nm but does not exceed 50 nm.

For making the side walls of the upper second metal layer M2 as closely perpendicular to the film surface as possible, the thickness of the upper second metal layer M2 is preferably ½ that of the upper first metal layer M1 or less.

Since the hard masks may become magnetoresistive film electrodes, the resistance-area product (RA) of the upper first metal layer M1 is preferably 0.5Ω·μm² or less.

Preferably, Ta and NiFe are used as the upper first metal layer M1 and upper second metal layer M2, respectively. Namely, the magnetoresistive film etching method in accordance with this embodiment includes the step of forming the upper first metal layer M1 and upper second metal layer M2 made of materials different from each other successively on the magnetoresistive film MR (FIG. 2).

Figure 4:
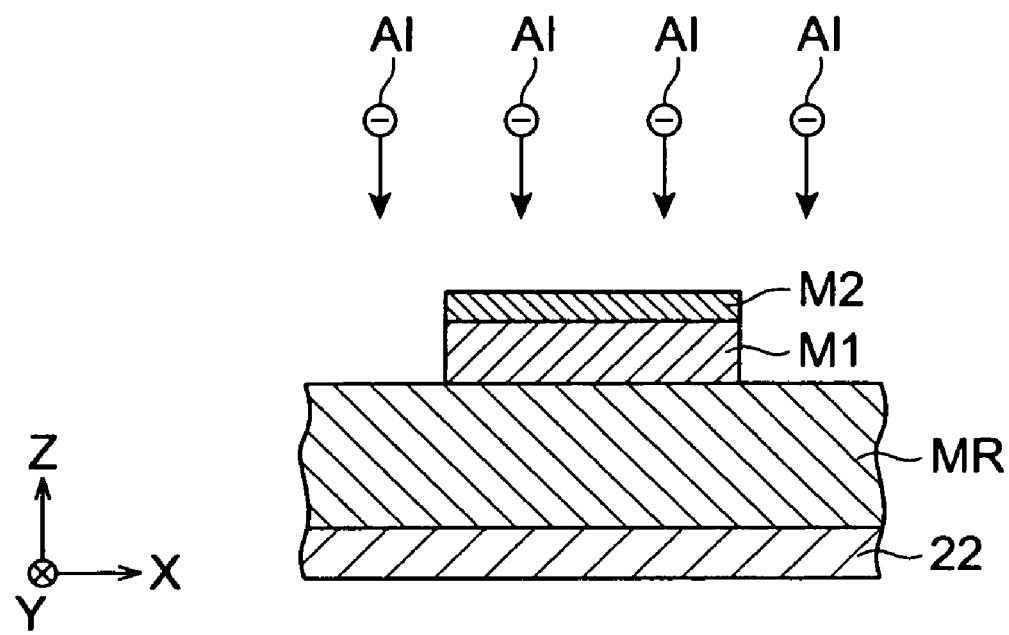
FIG. 4 is a sectional view of the magnetoresistive device intermediate.

FIG. 4 is a sectional view of the magnetoresistive device intermediate.

When reactive ions AI are made incident on the front face of the upper first metal layer M1 by the RIE, the uncoated area of the first metal layer M1 is etched, whereby the front face of the magnetoresistive film MR is exposed.

Subsequently, using the upper first metal layer M1 (upper second metal layer M2) patterned by the etching as a mask, the magnetoresistive film MR is etched. Though the above-mentioned reactive ion etching (RIE), which is a dry etching method, is used for this etching, IBE which makes ions perpendicularly incident on the front face of the magnetoresistive film MR is also employable. When the reactive ions AI are made incident on the front face of the magnetoresistive film MR, the uncoated area of the magnetoresistive film MR is etched, whereby the front face of the metal layer 22 thereunder is exposed.

Figure 5:
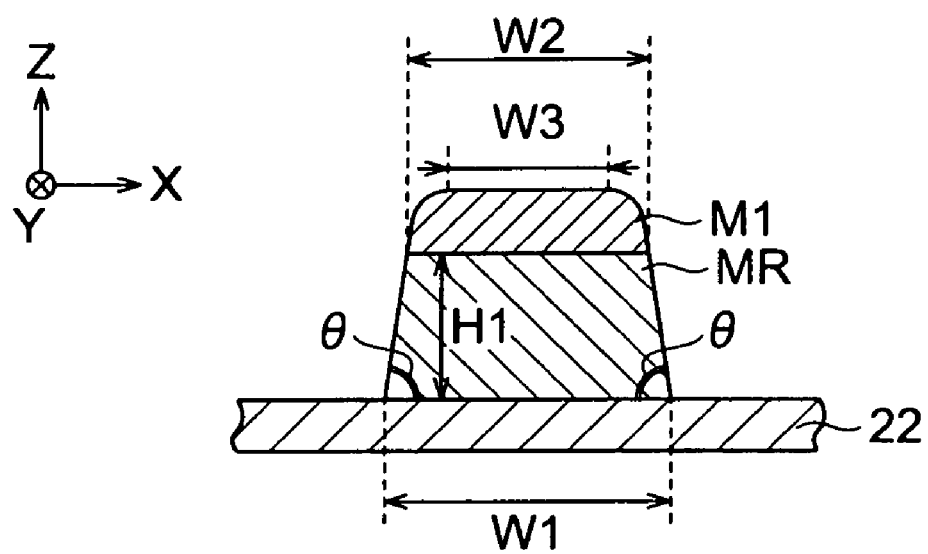
FIG. 5 is a sectional view of the magnetoresistive device intermediate.

FIG. 5 is a sectional view of the magnetoresistive device intermediate.

The above-mentioned step of RIE etches the magnetoresistive film MR. Though the upper second metal layer M2 sets its thickness such as to be removed in the step of etching the same, it may be left as well. Alternatively, the upper second metal layer M2 may intentionally be removed before etching the magnetoresistive film MR.

The above-mentioned etching method can precisely etch the magnetoresistive film MR with a high controllability, so as to form the magnetoresistive film MR having a narrow track width.

The maximum value W1 of width in the track width direction (X direction) of the magnetoresistive film MR etched by using the metal layers M1, M2 as hard masks, the width W2 (average value) in the track width direction of a free layer 25 within the magnetoresistive film MR, and the thickness H1 between the upper and lower faces of the magnetoresistive film MR have the following relationships. Here, the maximum value W1 is given by the length of the surface of the magnetoresistive film MR adjacent to the lower metal layer 22, while an antiferromagnetic layer constituting a pinned layer is present at this position. For making the side faces of the magnetoresistive film MR steep, the difference between the widths W1 and W2 is set small when the thickness H1 is sufficiently practical. The thickness of the free layer (ferromagnetic layer 25; see FIG. 7) is at least the thickness H1 and does not exceed a size which has not conventionally been acquired. This example yields the magnetoresistive film MR in which the width W1 is 60 nm, the width W2 is 50 nm, the width W3 of the top face of the upper first metal layer M1 along the track width direction is 40 nm, and the thickness H1 is 20 nm. Assuming that these values include errors, the magnetoresistive film MR having the following scale can be obtained in this embodiment.

$$0 < W1 - W2 \leq 20 \text{ nm}$$

$$H1 \leq W2 \leq 70 \text{ nm}$$

$$5 \text{ nm} \leq H1 \leq 30 \text{ nm}$$

Since the magnetoresistive film MR has a narrow width in the track width direction while its side faces are steep, the effective track width becomes narrower, whereby a magnetic head using the same can read information from a smaller magnetic recording area. The angle θ formed between each side face of the magnetoresistive film MR within the XZ plane and the front face of the lower metal layer 22 acting as an undercoat layer is 76° in this example. A preferred range of the angle θ is at least 45° but not more than 90°, more preferably at least 60° but not more than 90°. Since the side faces of the magnetoresistive film MR are thus steep, the magnetic field from a bias layer 28 (see FIG. 7D) adjacent to the magnetoresistive film MR can be provided evenly within the magnetoresistive film, whereby characteristics can be restrained from fluctuating.

A method of manufacturing a magnetoresistive device including the above-mentioned etching steps will now be explained.

FIGS. 6A to 6D are plan views of the magnetoresistive device intermediate. FIG. 7A is a sectional view of the magnetoresistive device intermediate taken along the line VIIA-VIIA of FIG. 6A. FIG. 7B is a sectional view of the magnetoresistive device intermediate taken along the line VIIB-VIIB of FIG. 6B. FIG. 7C is a sectional view of the magnetoresistive device intermediate taken along the line VIIC-VIIC of FIG. 6C. FIG. 7D is a sectional view of the magnetoresistive device intermediate taken along the line VIID-VIID of FIG. 6D.

The following explanation assumes that materials and thicknesses of constituents for a TMR (Tunnel Magneto-Resistive) device as the magnetoresistive device are as follows.

An upper magnetic shield 31 is made of NiFe having a thickness of 2 μm. An upper metal layer 30 is made of Ta having a thickness of 5 nm. An upper second metal layer M2 is made of NiFe having a thickness of 10 nm. An upper first metal layer M1 is made of Ta having a thickness of 50 nm. An upper ferromagnetic layer (free layer) 25 is made by laminating NiFe having a thickness of 3 nm on CoFe having a thickness of 1 nm. A tunnel barrier layer 24 is made of $Al_2O_3$ having a thickness of 0.6 nm. A lower magnetic layer 23 constitutes a pinned layer by laminating CoFe as a ferromagnetic layer having a thickness of 2 nm, Ru as a nonmagnetic layer having a thickness of 0.8 nm, and CoFe as a ferromagnetic layer having a thickness of 3 nm on PtMn as an antiferromagnetic layer having a thickness of 15 nm. A lower metal layer 22 is made by laminating NiFe having a thickness of 2 nm on Ta having a thickness of 5 nm. A lower magnetic shield 21 is made of NiFe having a thickness of 2 μm.

Materials positioned beside the magnetoresistive film MR and their thicknesses are as follows. A hard magnetic layer 28 acting as a longitudinal bias layer is made by laminating CoPt having a thickness of 30 nm and Ta having a thickness of 20 nm on TiW having a thickness of 10 nm. An insulating layer 29 is made of $Al_2O_3$ having a thickness of 60 nm. An insulating layer 27 is made of $Al_2O_3$ having a thickness of 10 nm. MgO and the like can also be used in place of $Al_2O_3$ in the above.

First, a nonmagnetic substrate S made of AlTiC or the like is prepared.

Figure 6A:
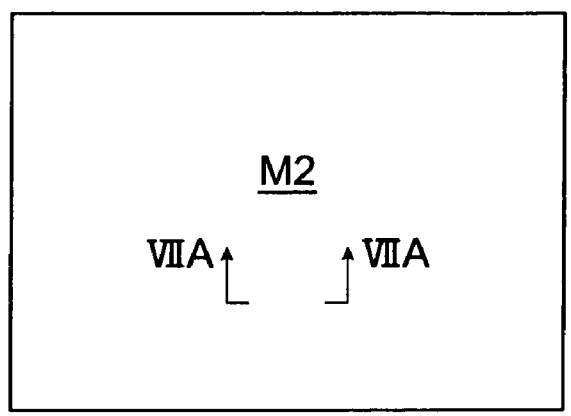
FIG. 6A is a plan view of the magnetoresistive device intermediate.
Figure 7A:
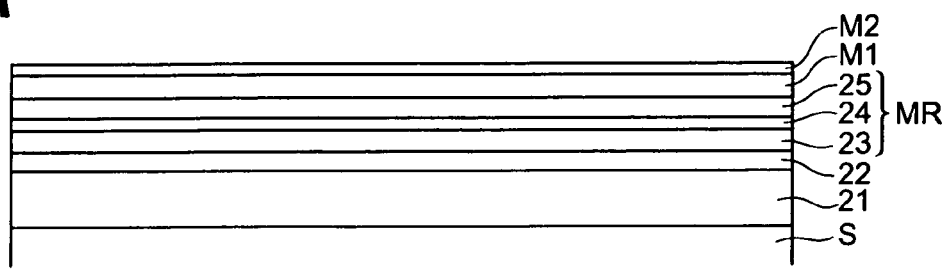
FIG. 7A is a sectional view of the magnetoresistive device intermediate taken along the line VIIA-VIIA of FIG. 6A.
Figure 7B:
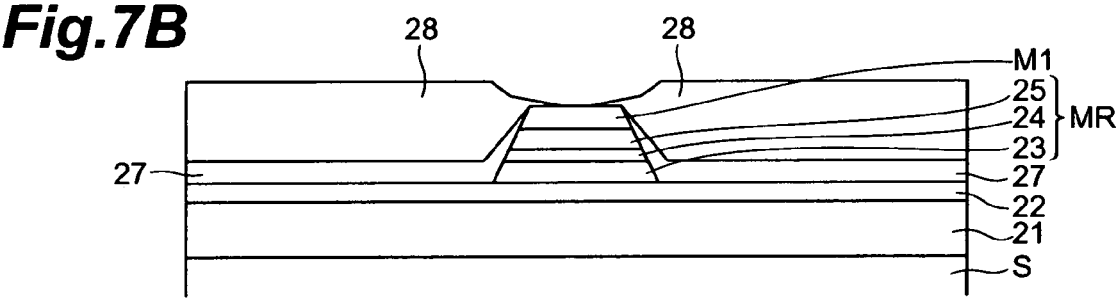
FIG. 7B is a sectional view of the magnetoresistive device intermediate taken along the line VIIB-VIIB of FIG. 6B.
Figure 7C:
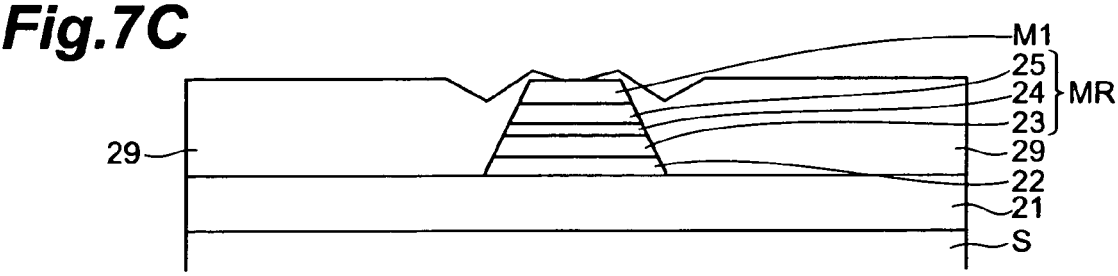
FIG. 7C is a sectional view of the magnetoresistive device intermediate taken along the line VIIC-VIIC of FIG. 6C.
Figure 7D:
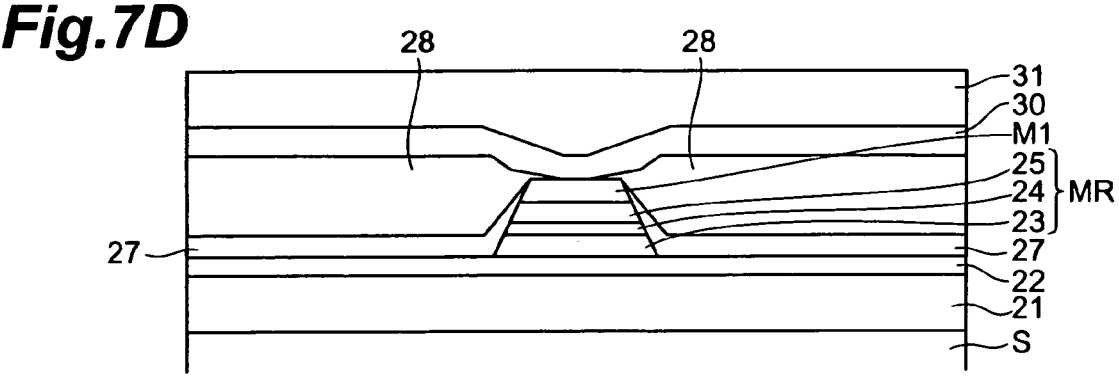
FIG. 7D is a sectional view of the magnetoresistive device intermediate taken along the line VIID-VIID of FIG. 6D.

Next, the lower magnetic shield 21, lower metal layer 22, lower ferromagnetic layer 23, insulating layer (tunnel barrier layer) 24, upper ferromagnetic layer 25, upper first metal layer M1, and upper second metal layer M2 are successively formed on the nonmagnetic substrate S (see FIGS. 6A and 7A). When one layer includes a plurality of tiers, the lower tier is formed earlier. The lower magnetic shield 21 can be formed by using wet plating, while the other layers 22, 23, 24, 25, M1, and M2 can be formed by sputtering.

In the wet plating, not only electroless plating using a solution containing a metal constituting a raw material, but also electric plating can be employed.

Next, a mask exposing two regions R1, R2 (corresponding to openings OP1, OP2) separated from each other in the X direction is formed by resists PR1, PR2 on the magnetoresistive device intermediate formed by the foregoing steps, the exposed regions are removed by dry etching (IBE) along the depth direction from the front face side to the front face of the upper first metal layer M1, so as to form a mask made of the upper second metal layer M2 (the steps of FIGS. 1 and 2 mentioned above).

Subsequently, the resist mask is removed, and further etching is performed by RIE while using the upper second metal layer M2 as a mask, so as to expose the front face of the magnetoresistive film MR, thereby forming a mask made of the upper first metal layer M1 (the step of FIG. 3 mentioned above).

Figure 6B:
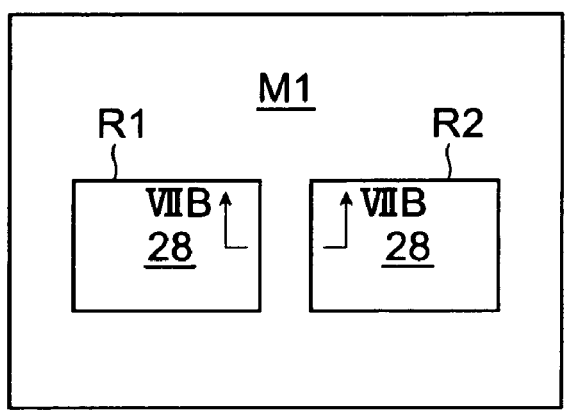
FIG. 6B is a plan view of the magnetoresistive device intermediate.

Using the upper first metal layer M1 (upper second metal layer M2) as a mask, the magnetoresistive film MR is further etched by RIE (the step of FIG. 4 mentioned above), so as to expose the front face of the lower metal layer 22 (see FIG. 5 mentioned above). Then, in the state where the mask made of the upper first metal layer M1 remains while removing the upper second metal layer M2 as appropriate, the insulating layer 27 and hard magnetic layer 28 are further successively deposited on the whole surface of the intermediate. Thereafter, the insulating layer 27 and hard magnetic layer 28 positioned on the outside of the regions R1, R2 are removed by polishing or dry etching, so as to leave the insulating layer 27 and hard magnetic layer 28 within the regions R1, R2 (FIGS. 6B and 7B). The distance between the regions R1, R2 becomes a track width of a magnetic recording medium.

Figure 6C:
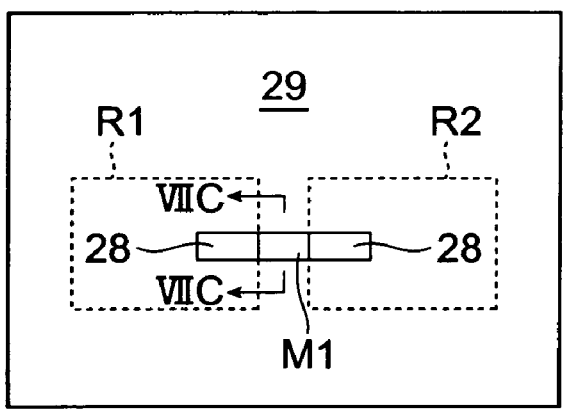
FIG. 6C is a plan view of the magnetoresistive device intermediate.

Next, the whole surface of the intermediate is coated with a resist. The resist is exposed to a rectangular pattern of light traversing the regions R1, R2 and having a center part located in the traversing part, and then is developed, so as to form a thin mask bridging the regions R1, R2. Using this mask, the exposed surface about the rectangular pattern is etched (ion-milled) to the front face of the lower magnetic shield 21. Thereafter, the insulating layer 29 is formed within the etched area, and then the mask is peeled off (lifted off) (FIGS. 6C and 7C).

Figure 6D:
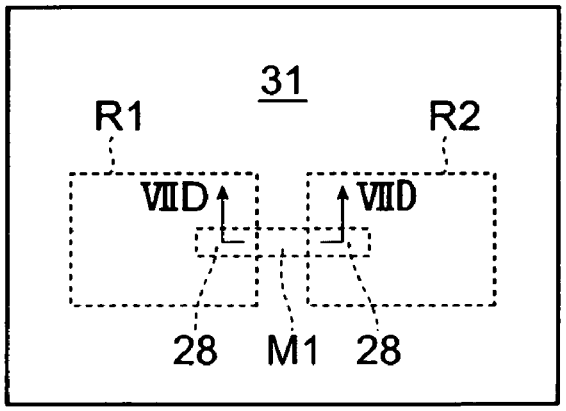
FIG. 6D is a plan view of the magnetoresistive device intermediate.

Further, the upper metal layer 30 and upper magnetic shield 31 are successively deposited on the insulating layer 29 and MR device. The upper metal layer 30 and upper magnetic shield 31 are made by sputtering and plating, respectively (FIGS. 6D and 7D). The foregoing completes the magnetoresistive device having a TMR structure. The direction of magnetization of the pinned layer is fixed to one direction by application of heat and a magnetic field.

Figure 8:
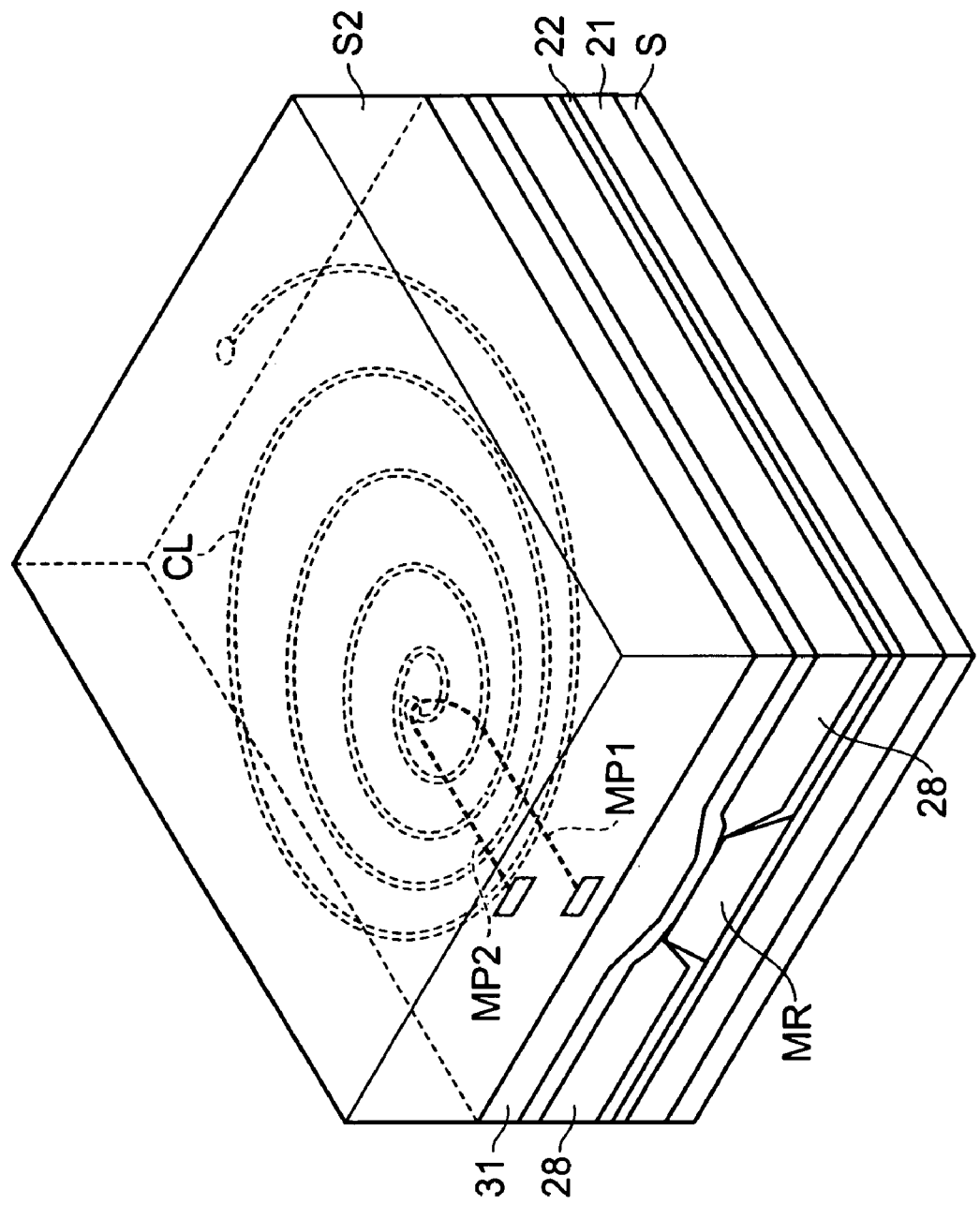
FIG. 8 is a perspective view of a thin-film magnetic head.

FIG. 8 is a perspective view of a thin-film magnetic head.

The thin-film magnetic head is made by laminating a writing substrate S2, which is equipped with a device for writing magnetic data, on a magnetoresistive device substrate provided with the above-mentioned magnetoresistive film MR. The substrate S2 incorporates a spiral coil CL therein, and comprises a main magnetic pole MP1 for drawing a magnetic flux generated by the coil CL and a trailing shield MP2 magnetically coupled to the main magnetic pole MP1. When a current is caused to flow through the coil CL, data can be written into a magnetic recording medium located on the outside. When a magnetic recording area of the magnetic recording medium passes near the magnetoresistive film MR, the resistance value of the magnetoresistive film MR changes, whereby the data recorded in the magnetic recording area can be read.

Figure 9:
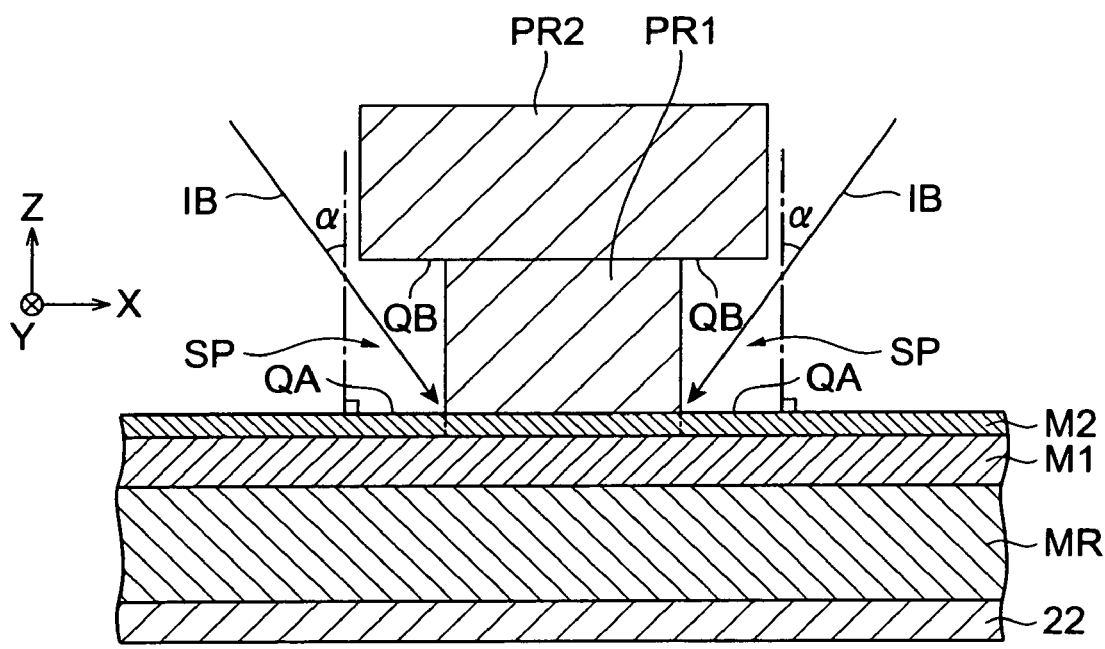
FIG. 9 is a sectional view of the magnetoresistive device intermediate in accordance with another embodiment.

FIG. 9 is a sectional view of the magnetoresistive device intermediate in accordance with another embodiment.

Though a complete space is formed under the bridge part BG in the example shown in FIG. 2, the first resist PR1 may be located under the bridge part BG. In this case, while the pattern of the first resist PR1 is the same as that of the second resist PR2, the etching rate of the first resist PR2 with respect to the developer is higher, so that the width in the track width direction of the first resist PR1 after the development is narrower than that of the second resist PR2. This case yields effects similar to those mentioned above, since a space SP exists between the lower face QB of the second resist PR2 and the front face QA of the upper second metal layer M2.

Figure 10:
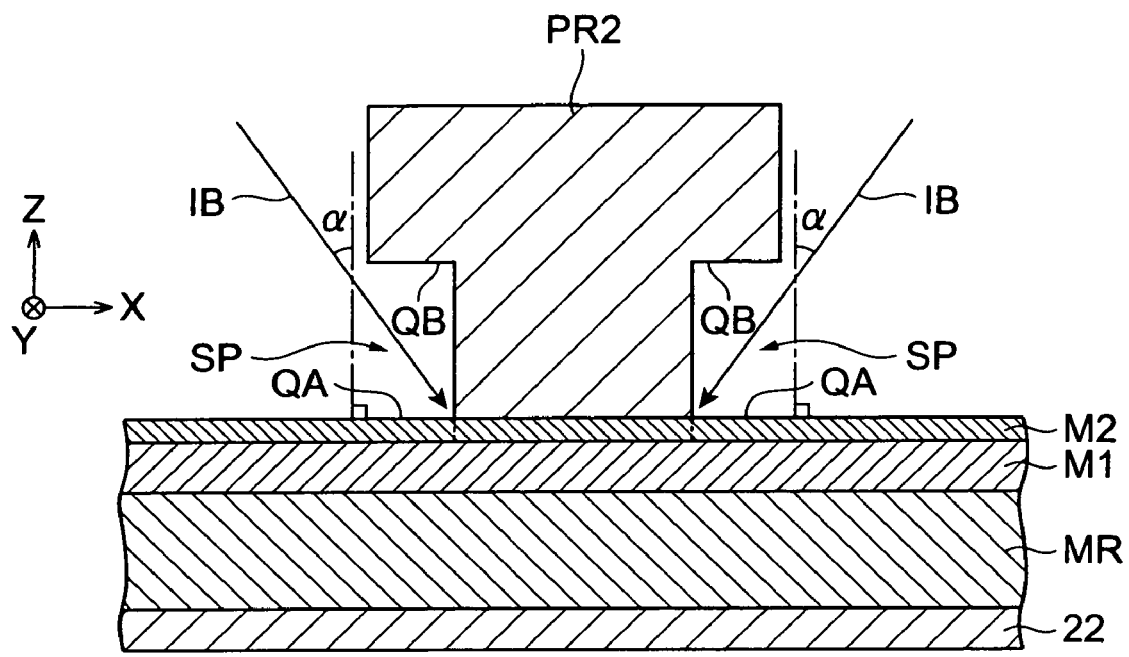
FIG. 10 is a sectional view of the magnetoresistive device intermediate in accordance with still another embodiment.

FIG. 10 is a sectional view of the magnetoresistive device intermediate in accordance with still another embodiment.

The first resist PR1 and second resist PR2 are made of different materials in the example shown in FIG. 9, but may be made of the same material. Namely, an additional layer having openings separated from each other by a track width is formed within the space SP beforehand, the resist PR2 is applied onto this layer, and then the above-mentioned openings OP21, OP22 are patterned. Removing the additional layer thereafter can form the resist PR2 having an undercut as shown in FIG. 10. Here, the distance between the openings OP21, OP22 in the track width direction is set wider than the width of the openings of the additional layer.

This case also yields effects similar to those mentioned above, since the space SP exists between the lower face QB of the second resist PR2 and the front face QA of the upper second metal layer M2.

As explained in the foregoing, by using a film whose ion beam etching rate is higher than that of the upper first metal layer M1 as the upper second metal layer M2, the above-mentioned etching method can cause sufficient over-etching and attain a higher etching controllability. The above-mentioned etching method does not necessitate trimming of the upper first metal layer M1 and second metal layer M2, so that solely controlling the etching time of the upper first metal layer M1 makes it possible to carry out processes with a high controllability and suppress the height of masks which may cause fluctuations. The above-mentioned method is also applicable to the etching of magnetoresistive films in magnetic random access memories (MRAM).

What is claimed is:

1. A method of etching a magnetoresistive film, the method comprising the steps of:
   (a) preparing a substrate having the magnetoresistive film to form first and second hard masks made of materials different from each other successively on the magnetoresistive film;
   (b) forming, on the second hard mask, a first resist that has an opening, and forming, on the first resist, a second resist that has first and second openings separated from each other, wherein
       the first and second openings of the second resist overlap the opening of the first resist, and
       an area between the first and the second openings of the second resist forms a bridge part, and a space is interposed between the bridge part and the second hard mask;
   (c) a first etching step of etching a surface of the second hard mask, wherein the second hard mask is subjected to dry-etching and the bridge part of the second resist is used as a mask during dry-etching, the dry-etching being performed by irradiating the second hard mask with an ion beam while rotating the substrate, wherein an incident angle α of the ion beam is greater than 0° and is not more than 70°;

(d) a second etching step of etching a surface of the first hard mask by using the second hard mask patterned by etching, wherein the second etching step is reactive ion etching and the reactive ion etching differs from the first etching step, and (e) a third etching step of etching a surface of the magnetoresistive film by using the first hard mask patterned by at least the second etching step, wherein the third etching step includes dry etching or reactive ion etching;

wherein the first hard mask has a thickness of 50 nm or less;

wherein the first hard mask contains at least one species selected from the metal group consisting of Ta, Ti, and W; and wherein the second hard mask contains at least one species selected from the metal group consisting of Ni, Co, Fe, and Cu.

2. The etching method according to claim 1, wherein the first etching step is ion beam etching that utilizes Ar gas; and wherein the second hard mask is made of a material whose etching rate with respect to the Ar gas is higher than that of the first hard mask.

3. The etching method according to claim 1, wherein the first and second resists are made of materials different from each other.

4. The etching method according to claim 1, wherein the second hard mask is made of a material whose etching rate with respect to a gas containing F or Cl in the step (d) is lower than that of the first hard mask.

5. The etching method according to claim 1, wherein the second hard mask has a thickness of ½ that of the first hard mask or less.

6. The etching method according to claim 1, wherein the maximum value W1 in the track width direction of the magnetoresistive film, the width W2 in the track width direction of a free layer in the magnetoresistive film, and the thickness H1 of the magnetoresistive film satisfy the following relationships:

$$0 < W1 - W2 \leq 20 \text{ nm}$$

$$H1 \leq W2 \leq 70 \text{ nm}$$

$$5 \text{ nm} \leq H1 \leq 30 \text{ nm}.$$

7. The etching method according to claim 1, wherein the first hard mask has a resistance-area product of 0.5 $\Omega \cdot \mu m^2$ or less.

8. The etching method according to claim 1, wherein the second etching step is reactive ion etching utilizing a gas containing F or Cl.

9. The etching method according to claim 8, wherein the reactive ion etching utilizes $CF_4$ gas.

10. The etching method according to claim 1, wherein the third etching step utilizes dry etching.

11. The etching method according to claim 1, wherein the third etching step utilizes reactive ion etching.

12. The etching method according to claim 1, wherein the third etching step is a dry etching step utilizing Ar gas.

13. The etching method according to claim 1, wherein the third etching step is a reactive ion etching step utilizing a gas containing F or Cl.

* * * * *